(12) United States Patent
Lannutti

(10) Patent No.: US 12,292,112 B2
(45) Date of Patent: May 6, 2025

(54) HIGH-OFFSET BELT TENSIONER WITH COUNTERBALANCE TORSION SPRING FORCE

(71) Applicant: DAYCO IP HOLDINGS, LLC, Roseville, MI (US)

(72) Inventor: Anthony E. Lannutti, Fayetteville, AR (US)

(73) Assignee: MUVIQ S.R.L., Ivrea (IT)

( * ) Notice: Subject to any disclaimer, the term of this patent is extended or adjusted under 35 U.S.C. 154(b) by 80 days.

(21) Appl. No.: 17/680,541

(22) Filed: Feb. 25, 2022

(65) Prior Publication Data

US 2022/0275852 A1    Sep. 1, 2022

Related U.S. Application Data

(60) Provisional application No. 63/153,982, filed on Feb. 26, 2021.

(51) Int. Cl.
*F16H 7/12* (2006.01)
*F16H 7/08* (2006.01)

(52) U.S. Cl.
CPC ......... *F16H 7/1218* (2013.01); *F16H 7/0831* (2013.01); *F16H 7/1209* (2013.01);
(Continued)

(58) Field of Classification Search
CPC ........ F16H 7/1218; F16H 7/0831; F16H 7/08; F16H 2007/081; F16H 2007/0863;
(Continued)

(56) References Cited

U.S. PATENT DOCUMENTS 4,473,362 A * 9/1984 Thomey .................. F02B 67/06
474/135
4,557,709 A * 12/1985 St. John ................ F16H 7/1218
474/135
(Continued)

FOREIGN PATENT DOCUMENTS

DE     102005060916 A1 *  6/2007  .......... F16H 7/1218
WO  WO-2020146231 A1 *  7/2020  ............... F16H 7/12

OTHER PUBLICATIONS

International Search Report and Written Opinion, PCT/US22/17598, Jun. 29, 2022, 14 pages.
(Continued)

*Primary Examiner* — Michael R Mansen
*Assistant Examiner* — Raveen J Dias
(74) *Attorney, Agent, or Firm* — FisherBroyles, LLP; Susan M. Oiler

(57) ABSTRACT

High-offset belt tensioners have a support base with a pivot tube and an arm coupled thereto rotation about a pivot axis. A flat wire torsion spring has an inner spring hook attached to the pivot tube and an outer spring hook attached to a first end of the arm at a position that counterbalances a hub load force. The torsion spring applies a spring force to the arm in a direction that moves with the arm throughout its entire sweep in a belt engaging direction. A first plane of the hub load force is axially offset from a second plane of the spring force, a fulcrum is defined between first and second ends of the arm, and a first lineal axial distance from the fulcrum to the first plane is greater than or equal to a second lineal axial distance from the fulcrum to the second plane.

19 Claims, 11 Drawing Sheets

(52) U.S. Cl.
CPC ..... *F16H 7/1281* (2013.01); *F16H 2007/081* (2013.01); *F16H 2007/0865* (2013.01); *F16H 2007/0893* (2013.01)

(58) Field of Classification Search
CPC .. F16H 2007/0865; F16H 7/0829; F16H 7/10; F16H 7/12; F16H 7/1209; F16H 7/1281; F16H 2007/0893
USPC .................................................. 474/135, 112
See application file for complete search history.

(56) References Cited

U.S. PATENT DOCUMENTS

| | | | | |
|---|---|---|---|---|
| 5,083,984 | A * | 1/1992 | Quintus | F16H 7/1281 474/135 |
| 5,129,864 | A * | 7/1992 | Quintus | F16H 7/1281 474/135 |
| 5,354,242 | A * | 10/1994 | St. John | F16H 7/1218 474/135 |
| 5,370,586 | A * | 12/1994 | Thomsen | F16H 7/1281 267/155 |
| 5,405,297 | A * | 4/1995 | Gardner | F16H 7/1281 474/135 |
| 5,443,424 | A * | 8/1995 | Henderson | F16H 7/1218 474/135 |
| 5,545,095 | A * | 8/1996 | Henderson | F16H 7/1218 474/135 |
| 5,632,697 | A * | 5/1997 | Serkh | F16H 7/1218 474/135 |
| 5,772,549 | A * | 6/1998 | Berndt | F16H 7/1281 474/135 |
| 5,964,674 | A * | 10/1999 | Serkh | F16H 7/1218 474/135 |
| 5,993,340 | A * | 11/1999 | Rocca | F16F 7/06 474/133 |
| 5,993,343 | A * | 11/1999 | Rocca | F16H 7/1218 474/135 |
| 6,206,797 | B1 | 3/2001 | Quintus | |
| 6,855,079 | B2 * | 2/2005 | Cura | F16H 7/1281 474/135 |
| 7,186,196 | B2 | 3/2007 | Quintus | |
| 7,775,922 | B2 * | 8/2010 | Tanaka | F16C 33/74 474/110 |
| 7,837,582 | B2 * | 11/2010 | Smith | F16H 7/1281 474/138 |
| 7,985,151 | B2 * | 7/2011 | Singer | F16H 7/1281 474/135 |
| 8,157,682 | B2 * | 4/2012 | Serkh | F16H 7/1218 474/166 |
| 8,403,785 | B2 | 3/2013 | Lannutti | |
| 8,545,352 | B2 * | 10/2013 | Lannutti | F16H 7/1218 474/138 |
| 8,690,718 | B2 * | 4/2014 | Cantatore | F16H 7/1218 474/111 |
| 8,702,543 | B2 | 4/2014 | Quintus et al. | |
| 8,852,042 | B2 * | 10/2014 | Meckstroth | F16H 7/1218 474/135 |
| 8,888,627 | B2 * | 11/2014 | Crist | F16H 7/1218 474/135 |
| 9,249,866 | B2 * | 2/2016 | Lannutti | F16H 7/1218 |
| 9,394,977 | B2 * | 7/2016 | Dutil | F16H 7/1218 |
| 9,777,806 | B2 | 10/2017 | Dutil et al. | |
| 9,777,807 | B2 * | 10/2017 | Barillet | F16H 7/1218 |
| 9,829,081 | B2 * | 11/2017 | Jiang | F16H 7/1218 |
| 9,890,837 | B1 * | 2/2018 | Martinez | F16H 7/12 |
| 9,933,051 | B2 * | 4/2018 | Bauerdick | F16H 7/0831 |
| 9,982,760 | B2 * | 5/2018 | Jiang | F16H 7/1218 |
| 9,982,761 | B2 * | 5/2018 | Ma | F16H 7/0829 |
| 10,203,025 | B2 | 2/2019 | Lindstrom et al. | |
| 10,281,014 | B2 * | 5/2019 | Oishi | F16H 7/12 |
| 10,458,525 | B2 | 10/2019 | Dutil et al. | |
| 2003/0104888 | A1 * | 6/2003 | Cariccia | F16H 7/1218 474/135 |
| 2004/0014542 | A1 * | 1/2004 | Quintus | F16H 7/1218 474/135 |
| 2004/0063531 | A1 * | 4/2004 | Cura | F16H 7/1281 474/135 |
| 2004/0097311 | A1 * | 5/2004 | Smith | F16H 7/1281 474/135 |
| 2009/0082146 | A1 * | 3/2009 | Singer | F16H 7/1218 474/135 |
| 2011/0207568 | A1 * | 8/2011 | Smith | F16H 7/1281 474/135 |
| 2012/0058848 | A1 * | 3/2012 | Lannutti | F16H 7/1218 474/135 |
| 2013/0085027 | A1 * | 4/2013 | Meckstroth | F16H 7/1218 474/135 |
| 2014/0038758 | A1 * | 2/2014 | Jindai | F16H 7/1218 474/135 |
| 2014/0274510 | A1 * | 9/2014 | Dutil | F16H 7/0831 474/135 |
| 2015/0031484 | A1 * | 1/2015 | Lindstrom | F16H 7/1218 474/117 |
| 2015/0031485 | A1 * | 1/2015 | Lindstrom | F16H 7/1218 474/135 |
| 2015/0362047 | A1 * | 12/2015 | Barillet | F16H 7/1218 474/135 |
| 2017/0059015 | A1 * | 3/2017 | Oishi | F16H 7/1218 |
| 2024/0247706 | A1 * | 7/2024 | Lannutti | F02B 67/06 |

OTHER PUBLICATIONS

European Search Report, Application No. 22760366.9, Dec. 2, 2024, 10 pages.

* cited by examiner

HIGH-OFFSET BELT TENSIONER WITH COUNTERBALANCE TORSION SPRING FORCE

RELATED APPLICATIONS

This application claims the benefit of U.S. Provisional Application No. 63/153,982, filed Feb. 26, 2021, which is incorporated herein by reference in its entirety.

TECHNICAL FIELD

The present invention relates generally to high-offset belt tensioners and more particularly to a high-offset belt tensioner with a flat wire spring having its outer spring hook operatively connected to the arm of the belt tensioner and the inner spring hook operatively connected to the support base, with the outer spring hook at a position that counterbalances the hub load force with the torsion spring force.

BACKGROUND

A traditional flat wire ZED-style belt tensioner design has the inner spring hook attached to the arm arbor, which is seated around a pivot tube defined by a spring case and the outer spring hook is attached to the exterior wall of the spring case (see FIG. 10). In this design, the inner portion of the spring moves with the arm (i.e., winds and unwinds with movement of the arm) while the outer hook is stationary since it is connected to a stationary member of the belt tensioner, i.e., the spring case. Here, the direction of the spring force acting on the arm stays in the same location with respect to the spring case because the spring case is mounted to a non-rotatable member, such as an engine component or engine mount. As such, the direction of the spring force is directly on the pivot. As the tensioner arm moves from a free arm position to an install position, the direction of the force does not change. The spring winds onto the arm arbor of the spring case, which defines the pivot point for the arm and as such the force(s) always push inward on the pivot. Then, as the spring bushing wears over time, the axial spring force will urge and move the arm away from the belt sheave. In this traditional belt tensioner, a large bushing is needed on the pivot tube to reduce the pressure and improve alignment control therein.

There is a need for an improved design in which the spring force is moved radially outward away from the pivot to provide a better mechanical advantage to counterbalance the torsion spring force and improve wear over the lifetime of the belt tensioner.

SUMMARY

In all aspects, high-offset belt tensioners are disclosed that have a support base having a pivot tube that defines a pivot axis, an arm coupled to the support base for rotation about the pivot axis, the arm having a pivot tube-receiving first end having a lower surface facing the support base and an upper surface that in part defines a cup and having a second end offset axially from the first end, wherein the second end defines a pulley rotation axis, and a flat wire torsion spring having an inner spring hook attached to the pivot tube and an outer spring hook attached to the first end of the arm at a position that counterbalances a hub load force, wherein the flat wire torsion spring biases the arm in a belt engaging direction and applies a spring force acting on the arm. A direction of the spring force acting on the arm stays in the same location with respect to the arm and moves with the arm throughout its entire sweep in the belt engaging direction. A plane of the hub load force is axially offset from a plane of the spring force. And a fulcrum is defined between the first end and the second end of the arm and a first lineal axial distance (C) from the fulcrum to the plane of hub load force is larger than or about the same as a second lineal axial distance from the fulcrum to the plane of the spring force (H).

In one aspect, the high-offset belt tensioner has a pivot bushing seated within the first end of the arm and a damper bushing in operative engagement with the first end of the arm by an arm plate. The arm plate, when acting as a spring plate, or an axially biasing member has a deflection height that is varied across its surface area. A greatest deflection height thereof is positioned to be at a position that is opposite the hub load, thereby imparting the greatest force at the position that is opposite the hub load.

In another aspect, the arm plate has the damper bushing co-molded thereto. The arm plate and damper bushing are stationary and the arm rotates relative thereto. The arm plate has a bore therethrough defining an inner periphery and the inner periphery is seated between the pivot tube and an end cap with the damper bushing in contact with a lower surface of the first end of the arm. Here, the arm plate is conically shaped, thereby biasing the damper bushing into frictional engagement with the arm. The damper bushing is seated in the cup of the first end of the arm, and the arm plate is fixedly attached to the pivot tube and holds the damper bushing in operative engagement for rotation with the arm. The damper bushing has a flange extending axially toward the support base, and the flange is seated against the pivot tube. A wear surface of a main body of the damper bushing is seated against the arm plate and the main body includes a plurality of troughs for retention of grease. The high-offset belt tensioner has a ring seal member seated juxtaposed to an outermost surface of the flange of the pivot bushing.

In all aspects, the arm of the high-offset belt tensioner has a radially protruding enclosure in its radially outermost surface at a position that locates the enclosure in a protective orientation around the outer spring hook. The enclosure has an open bottom. The pivot bushing has an axially extending main body and either a radially inward or radially outward extending flange at a first end of the body. The pivot bushing has a slit extending axially through the main body, thereby allowing expansion of at least a second end thereof. The slit may be positioned through a key thereof, which is a radially outward extending tab. The pivot bushing is seated with the flange between the support base and the lower surface of the first end of the arm. The pivot bushing has a key protruding from an outer surface of the main body and the key is seated in a keyway of the arm for rotation therewith. The pivot bushing has a radially outward extending tab opposite the key, and the enclosure has received therein the radially outward extending tab.

In one embodiment, the pivot bushing is seated with the flange between the cup of the arm and an end cap. The high-offset belt tensioner has a ring seal member seated juxtaposed to an outermost surface of the flange of the pivot bushing.

In all aspects, the support base can have an arm travel limiting feature defining a preselected number of degrees for a maximum rotation of the arm and the arm has a mating feature engage with the arm travel limiting feature. The travel limiting feature is an arcuate slot in the pivot tube or a base of the support base.

DETAILED DESCRIPTION

Figure 1:
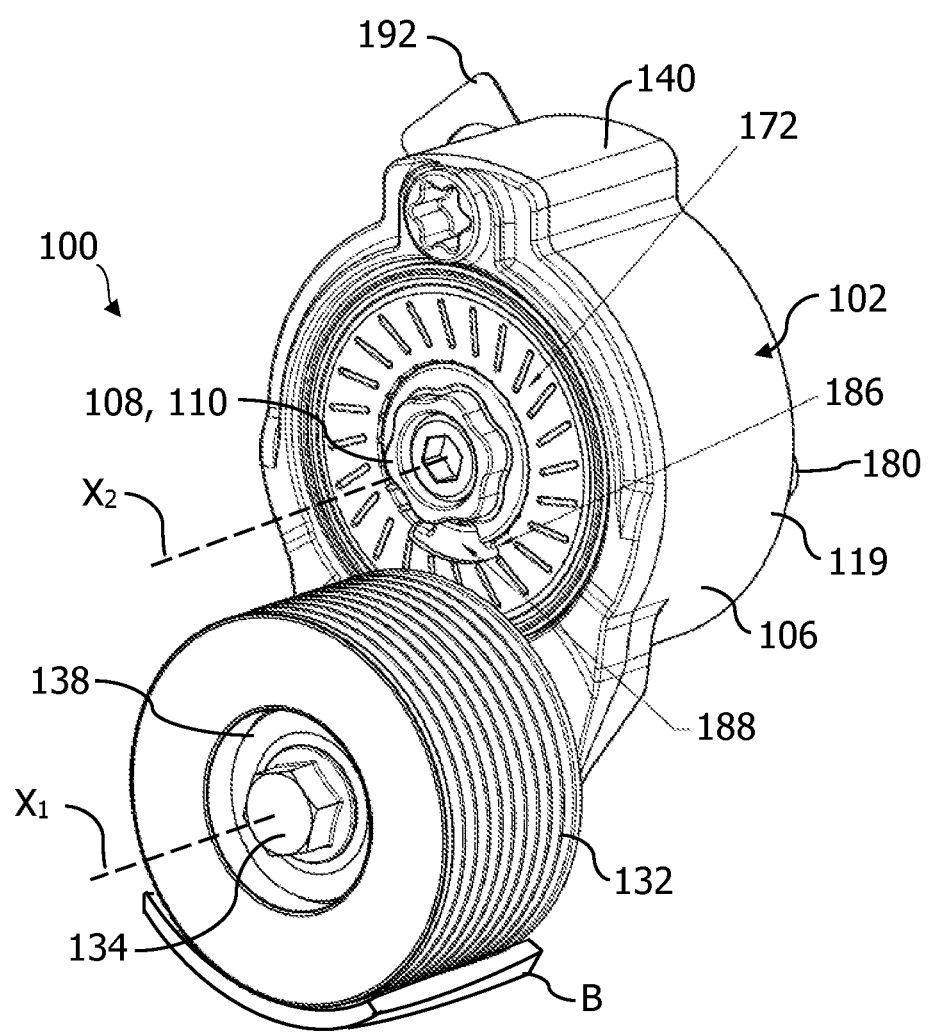
FIG. 1 is an top perspective view of a first embodiment of a high-offset belt tensioner with the arm plate removed therefrom.

The following detailed description will illustrate the general principles of the invention, examples of which are additionally illustrated in the accompanying drawings. In the drawings, like reference numbers indicate identical or functionally similar elements.

Figure 2:
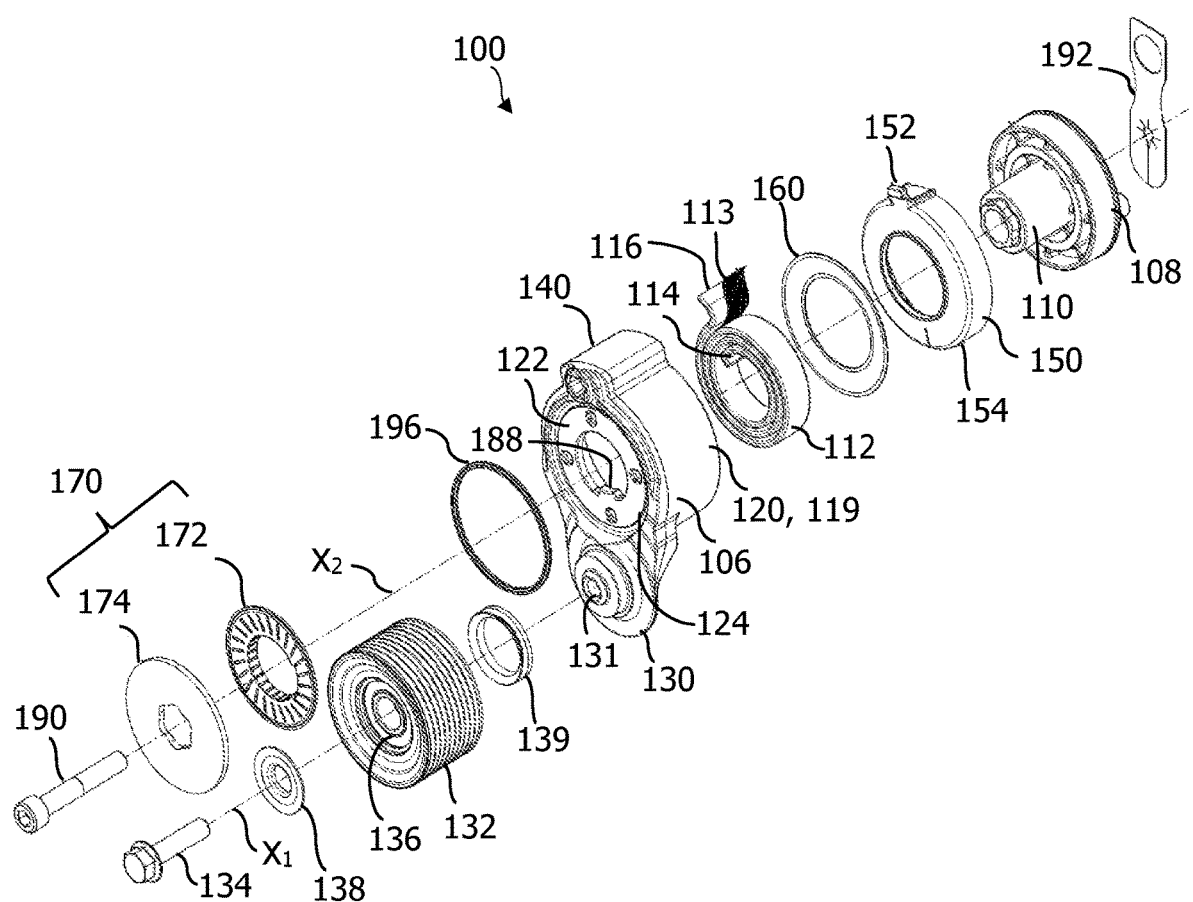
FIG. 2 is an exploded, top perspective view of the high-offset belt tensioner of FIG. 1, including the arm plate.
Figure 3:
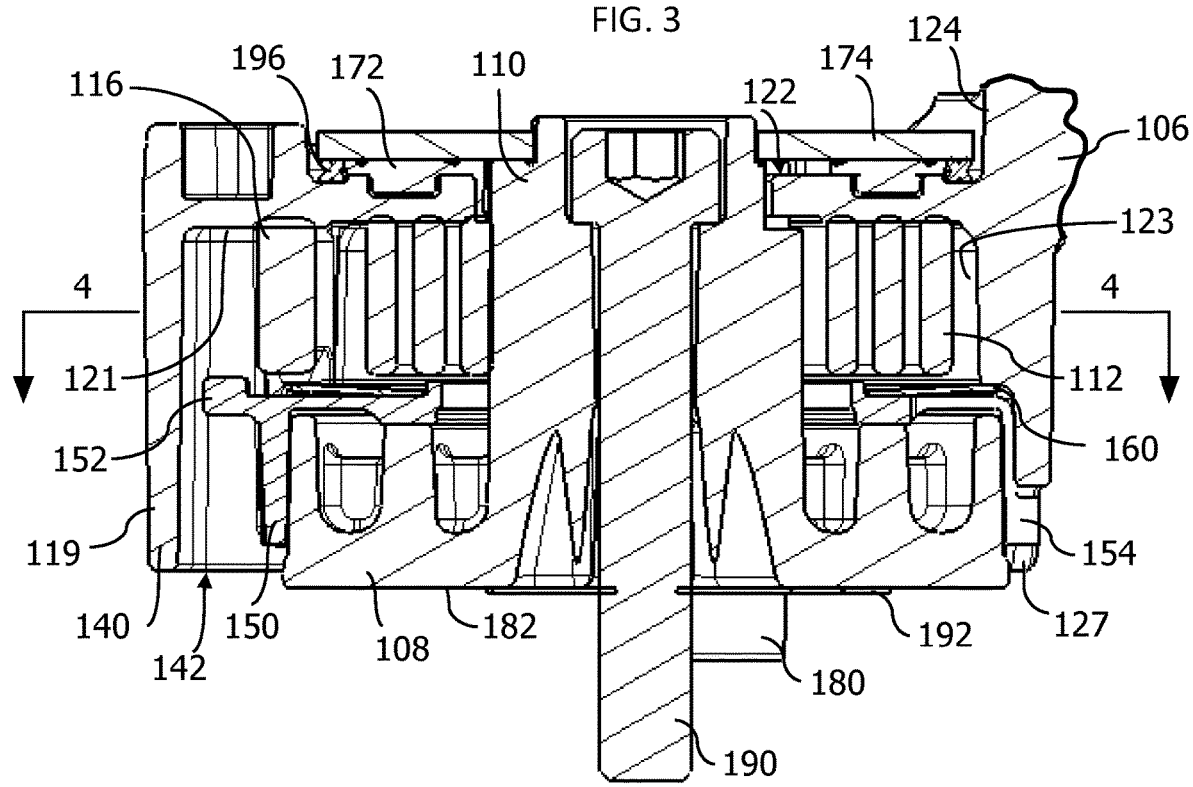
FIG. 3 is a longitudinal, cross-section through the main body of the high-offset-belt tensioner of FIG. 1.

Referring to FIGS. 1-3, a first embodiment of a high-offset belt tensioner 100 for providing a predetermined amount of tension upon a belt (B) of a belt system, often found in engine systems, such as a transmission belt system is exemplified. A high-offset belt tensioner is also referred to as a Zed type belt tensioner. As labeled in FIGS. 10 and 11, in a high-offset belt tensioner, a plane ($P_1$) coincident with a hub load force (IN) that is transverse to the pulley rotation axis ($X_1$) is axially offset above a plane coincident with a torsion spring force (IN) (a plane of the spring force) in the main body 102 of the tensioner 100. The tensioner 100 includes an arm 106 pivotally mounted to a support base 108, which has a pivot tube 110 defining a pivot axis ($X_2$) about which the arm pivots, and a torsion spring, here a flat wire spring 112, operatively coupled between the arm 106 and the support base 108. The belt tensioner 100 includes a bolt 190 received in and through the pivot tube 110 for mounting the belt tensioner in an engine system. As shown in FIG. 2, a bolt retainer 192 is present to hold the bolt 190 in place (and the components together) until time to install the belt tensioner 100 in the engine system. As best seen in FIG. 3, the arm 106 has a pivot tube-receiving first end 120 having a lower surface 121 that faces the support base 108, a circumferential outer wall 119 that defines a spring case 123 and an upper surface 122 that in part defines a cup 124 and having a second end 130 offset axially from the first end that defines a pulley rotation axis ($X_1$).

A pulley 132 is mounted for rotation to the second end 130 of the arm 106 by a bolt 134 extending through the hub of the pulley 132 and into a threaded bore 131 of the second end 130 of the arm 106. The pulley 132 is preferably journaled to the second end 130 by a roller bearing 136. A dust cover 138 in the shape of a washer is coaxially mounted between the roller bearing 136 and the head of the bolt 134 to protect the roller bearing 136 from debris and contamination. To seal the bottom of the pulley 132 against debris and contamination an annular seal 139, such as a V-ring, X-ring, or O-ring seal is seated in operative engagement with the roller bearing and the second end of the arm, best seen in FIG. 1.

Figure 4:
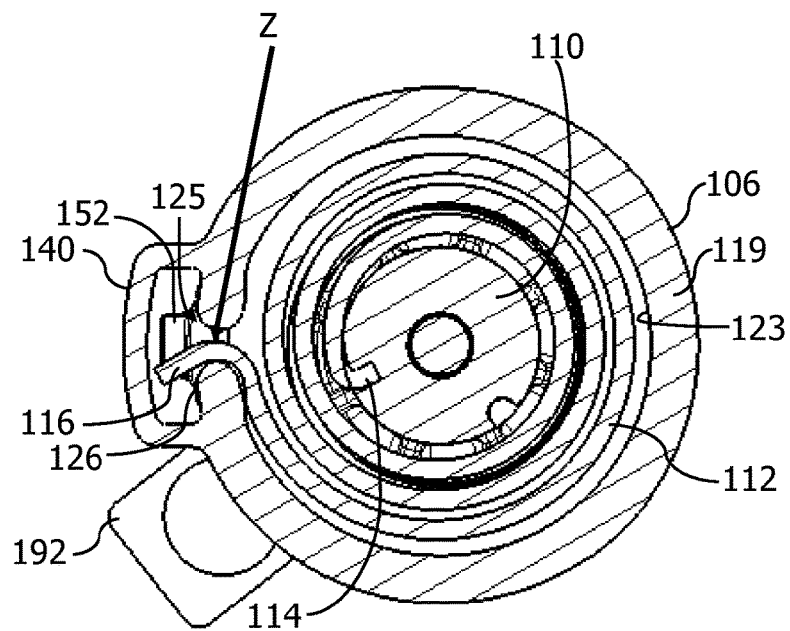
FIG. 4 is a transverse, cross-sectional view taken along line 4-4 shown in FIG. 3, which shows the flat wire spring with its inner hook connected to the support base and the outer hook connected to the arm.
Figure 5:
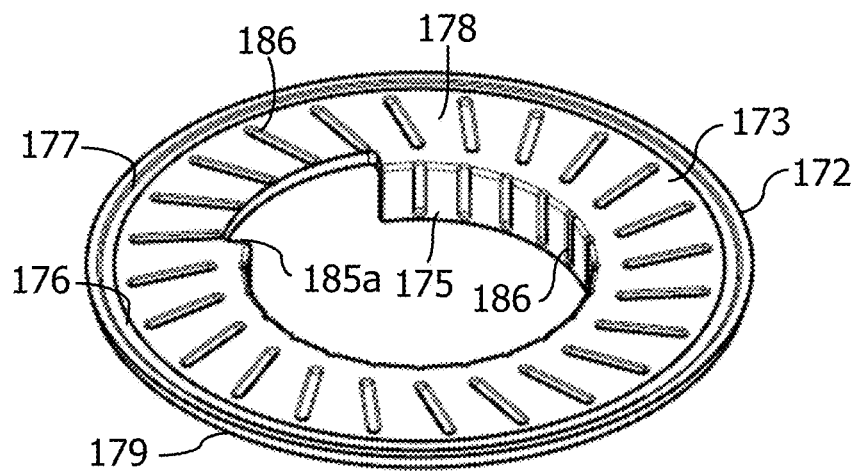
FIG. 5 is a top perspective view of a damper bushing from the first embodiment.
Figure 6:
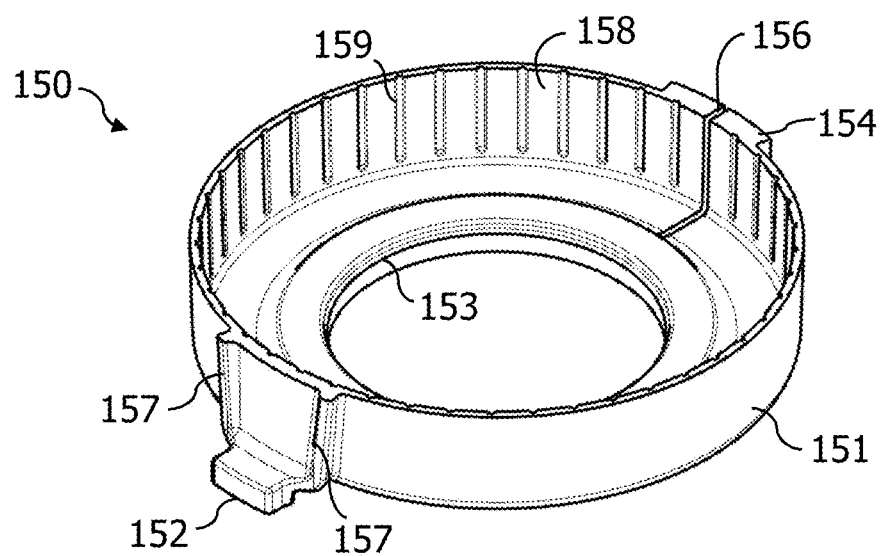
FIG. 6 is a bottom perspective view of a pivot bushing from the first embodiment.

Referring to FIGS. 2-4, the torsion spring 112 applies a torsional spring force on the arm 106 in the direction shown by arrow Z (FIG. 4) representing a belt engaging direction, such that the second end 130 of the arm 106 applies a corresponding tension force upon the transmission belt B (FIG. 1). The arm 106 and support base 108 can be manufactured from die-cast aluminum or other metals and some plastics if of sufficient strength. The torsion spring 112 may be manufactured from steel, but other suitable alternative materials (or combination of materials/components) to construct such components are also contemplated. Here, torsional spring 112 is a flat wire spring and a spring tape 113 is positioned between the coils of the flat wire spring as shown in FIG. 2. The spring tape 113 is coiled in a juxtaposed position with the flat wire spring 112, such that the spring tape 113 is between the coils of the flat wire spring and optionally, can be long enough to be present between the flat wire spring 112 and the interior walls of the arm 106. The use of spring tape 113 reduces frictional wear of the spring or other negative effects of friction such that spring collapse is reduced.

In contrast to standard belt tensioner configurations (see FIG. 10), turning to FIGS. 2-4, the flat wire torsion spring 112 has an inner spring end 114 attached to the pivot tube 110 and an outer spring end 116 attached to the arm 106 at a position that counterbalances the hub load force. This construction enables the outer portion of the flat wire spring 112 to move with the arm while the inner spring hook 114 is attached to the stationary, non-rotatable pivot tube 110 of the support base 108. As a result, a direction of the spring force acting on the arm 106 stays in the same location with respect to the arm 106 and moves with the arm 106 throughout its entire sweep toward the belt force. As labeled in FIG. 11, a fulcrum (G) is defined between the first end 120 and the second end 130 of the arm and a first lineal axial distance (C) from the fulcrum (G) to the plane of hub load force ($P_1$) is larger than a second lineal axial distance (H) from the fulcrum to the plane of the spring force. The inner and outer spring ends 114, 116 can be bent to define hooks, tangs, etc. to enhance the attachment of the spring to the respective pivot tube and arm.

Figure 10:
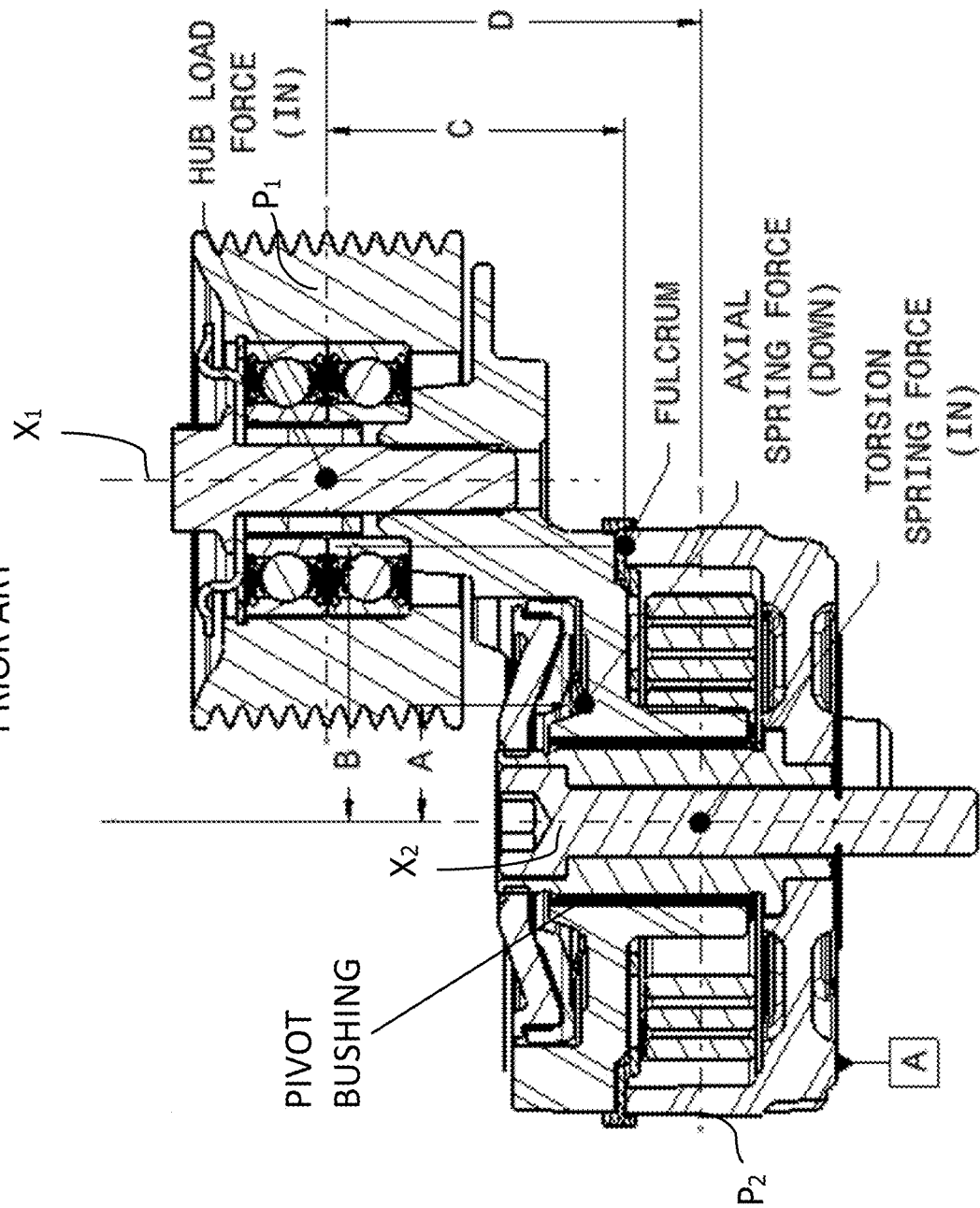
FIG. 10 is a longitudinal, cross-sectional view of a prior art high-offset belt tensioner.
Figure 11:
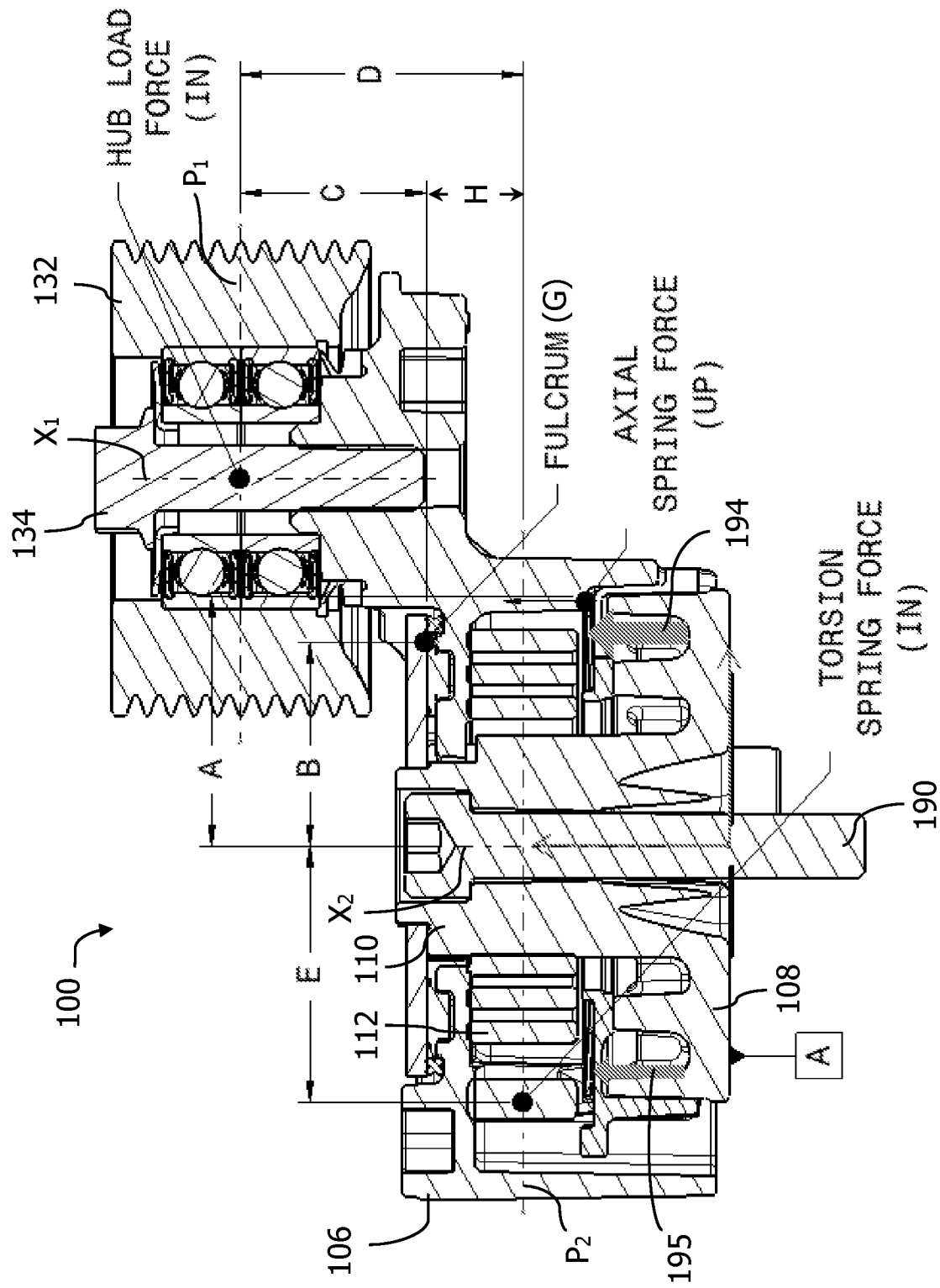
FIG. 11 is a longitudinal, cross-sectional view of the high-offset belt tensioner of FIG.

The prior art tensioner of FIG. 10 has a torsion spring force (IN) that is on/at the pivot tube and the distance between the fulcrum and the torsion spring force (C to D) is very small. The axial spring force in this situation is urging the arm towards datum (A), which means the arm will move away from the belt sheave as the spring bushing wears. In the disclosed embodiments, in comparison, the torsion spring force (E) has been moved away from the pivot tube. An advantage of moving the spring force away from the pivot tube and away from the pulley is to provide a better mechanical advantage to balance out the force applied at the pulley. As the spring moves, the direction of the force and magnitude will adjust as well.

In the embodiments disclosed herein, there is versatility in that the abutment location 126 (FIG. 4) of the arm 106 can be adjusted depending upon what is required to balance the forces in the high-offset belt tensioner. Also, the distance between the fulcrum and torsion spring force (H) is larger, thereby reducing (C) to being about half the distance of (D). The fulcrum radius (B) is also close to the same length as (A) with (B) being as large as possible. The axial spring force in this situation is moving away from datum A, meaning the arm is wearing towards the belt sheave. Due to packaging and cost constraints the pivot bushing in this design is not centered on (C) as discussed previously.

Figure 16:
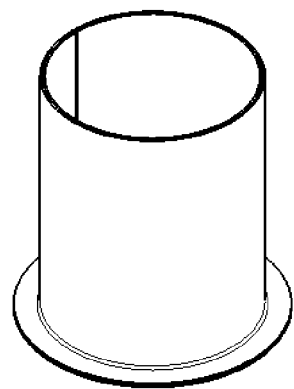
FIG. 16 is a perspective view of the pivot bushing from the prior art tensioner of FIG. 10.

The length and diameter of the pivot bushings was increased compared to prior art known pivot bushings from the tensioner of FIG. 10, which is shown in FIG. 16, to achieve lower Pressure Velocity (PV) via an overall increase in surface area to achieve longer bearing life. In this first embodiment, pivot bushing 150 and a portion of the damper bushing 172, collectively, contribute surface area as a pivot bushing, having a total surface area of 2890.5 mm$^2$ compared to the cylindrical bushings in the high-offset belt tensioner of FIGS. 10 and 16 that has a surface area of 2030 mm$^2$ resulting in 1.4 times the surface area. Further, the spring bushing contact surface area of the damper bushing 172 has an increase of about 2 times the surface area of the spring bushing of the tensioner of FIG. 10 (contact surface of 1692 mm$^2$ compared to 851 mm$^2$).

Referring again to FIGS. 1-4 and 7, the arm 106 has a radially protruding enclosure 140 in its radially outermost surface at a position that locates the enclosure 140 in a protective orientation around the outer spring end 116. The enclosure 140 has an open bottom 142, such that the outer spring end 116 of the flat wire spring 112 and a tab 152 of a pivot bushing 150 are able to be axially seated therein during the assembly process when the components of the main body 102 are axially seated in the spring case 123 defined by the pivot tube-receiving end 120 of the arm 106. As best seen in FIG. 4, the spring case 123 has an opening 125 therein that is aligned with the enclosure 140. The opening 125 defines a spring abutment feature 126 against which the outer spring end 116 is operatively seated to bias the arm 106 in the belt tensioning direction.

The components seated in the spring case 123 include the torsion spring 112 (discussed above), an axially biasing member 160 such as a Bellville washer, the pivot bushing 150, and the support base 108, in that order from left to right in FIG. 2 and top to bottom in FIG. 3 relative to each figure's respective orientation on the page. Turning now to FIGS. 2, 3, and 6-9, the pivot bushing 150 has an axially extending main body 151 and a radially inwardly extending flange 153. The main body 151 has a radially outward extending tab 152 opposite a radially outward protruding key 154. The tab 152 is received inside the enclosure 140 and includes axially extending ribs 157 defining the meets and bounds of the tab 152, which are seated against stops 141 inside the enclose. The pivot bushing 150 has a slit 156 extending axially through the key 154, thereby allowing some expansion thereof and the key 154 is received in a slot or keyway 127 in the spring case 123 of the arm 106, for rotation therewith. The pivot bushing 150 is seated with the flange 153 between the support base 108 and the lower surface 121 of the first end 120 of the arm 106, more specifically against the axially biasing member 160 and the support base 108. The interior surface 158 of the main body 151 includes a plurality of axially oriented troughs 159 for retention of grease.

The pivot bushing 150 is typically formed from wear resistant plastic. The flange 153 acts as a bearing surface and the pivot bushing as a whole, as best seen in the bottom view of FIG. 7 also acts to seal the spring case 123, thereby protecting the torsion spring from external contaminants. Additionally, secondary seals may be present to protect the components from contaminants, for example, V-ring, X-ring, O-ring seals, etc. While the pivot bushing 150 in this embodiment is a wear resistant plastic, it is within the scope of the invention to use other suitable bushing materials or bearing structures. The pivot bushing provides a bearing surface for the rotation and translation of elements of the tensioner along and about the pivot axis.

Figure 7:
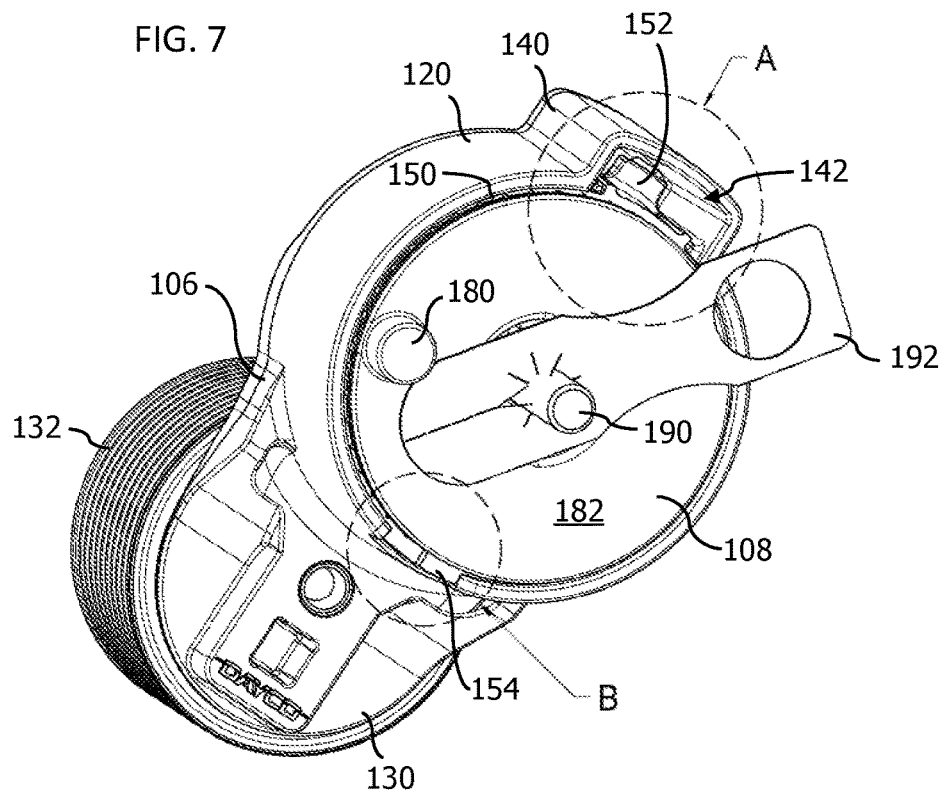
FIG. 7 is a bottom perspective view of the high-offset belt tensioner of FIG. 1.
Figure 8:
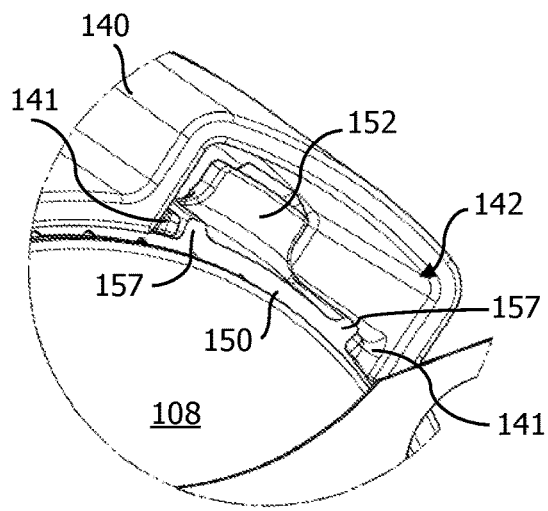
FIG. 8 is an enlarged view of the tab in the circle A of FIG. 7.
Figure 9:
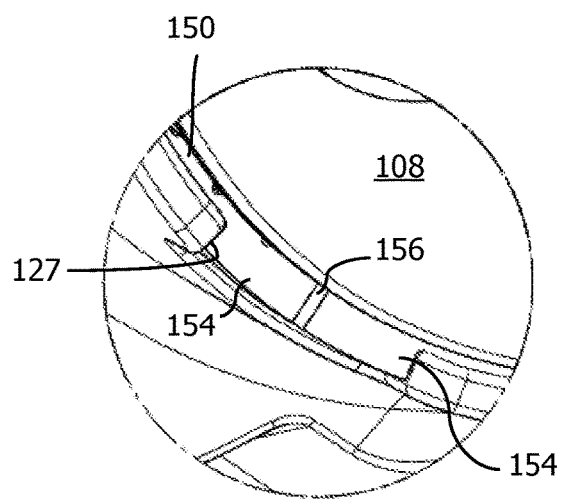
FIG. 9 is an enlarged view of the key in the circle B of FIG. 7.
Figure 13:
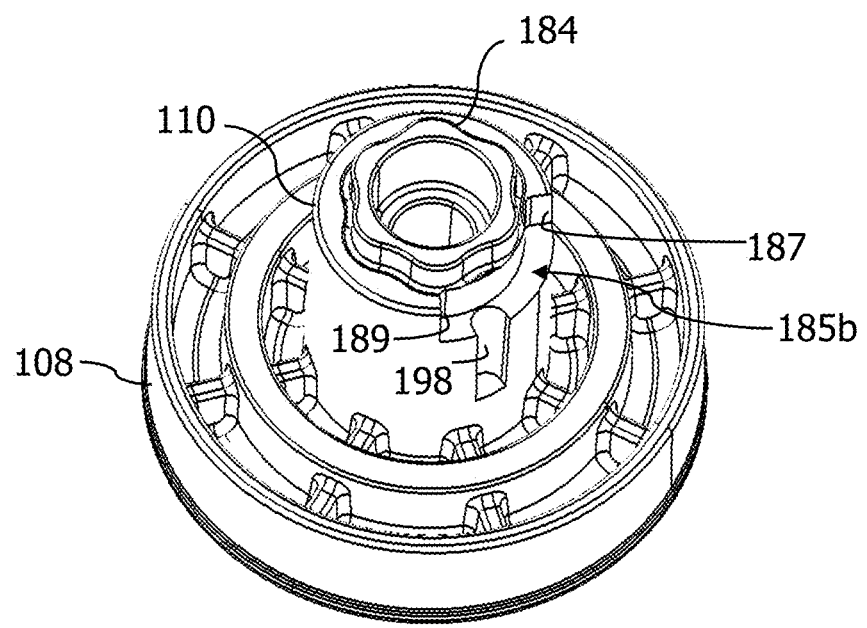
FIG. 13 is a top perspective view of the support base of the first embodiment.

With reference to FIGS. 2-3 and 7, the support base 108 includes a registration pin 180 protruding from the bottom exterior surface 182 thereof. As best seen in FIG. 13, pivot tube 110 terminates with a splined end 184. Proximate the splined end 184 an arm travel limiting slot 185a is recessed into the pivot tube 110. The arm travel limiting slot 185a is defined by a first stop shoulder and a second stop shoulder 187, 189 spaced a preselected number of degrees of rotation about the pivot axis. The pivot tube also includes a spring abutment feature 198 for connection to or receipt of the inner spring end 114. The spring abutment feature 198 may be a protrusion on or a recess in the pivot tube 110. In the illustrated embodiment, the spring abutment feature 198 is a vertical slot oriented parallel to the pivot axis X$_2$ defined by the pivot tube 110. One advantage of this embodiment is that the support base 108 can be manufactured with a blank pivot tube 110 and the arm travel limiting slot 185a and the spring abutment feature 198 can be machined into the pivot tube 110 thereafter to whatever specifications are needed for the degrees of rotation of the arm and the relative orientation of the slot to the position of the spring abutment feature and/or the position of the registration pin 180.

Figure 12:
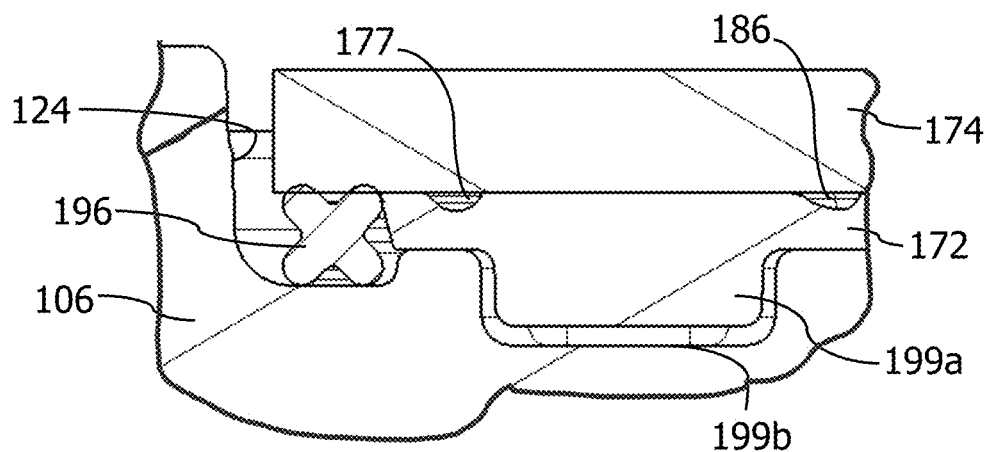
FIG. 12 is an enlarged longitudinal, cross-section of a portion of the damper bushing and ring seal seated between the arm plate and arm.

Turning now to FIGS. 1-3, 5 and 12, the high-offset belt tensioner 100 includes a damper assembly 170 seated in the cup 124 of the arm 106 in operative engagement with the arm 106 to provide frictional symmetric damping. The damper assembly includes a damper bushing 172 keyed to the arm 106 for rotation therewith and an arm plate 174 fixedly connected to the splined end 184 of the pivot tube 110. The damper bushing 172 has a radially extending annular plate 173 and an axially extending flange 175 oriented toward the support base 108 for pivotal engagement about the pivot tube 110. The upper surface 178 of the radially extending annular plate 173 proximate the outer periphery includes an annular wear surface 176 in operative engagement with the arm plate 174. The wear surface 176 includes an annular trough 177 and the outermost radial surface has a bevel 179 angled away from the upper surface toward the lower surface thereof to prevent contaminants from reaching the grease grooves 186 in the upper surface and in the flange 175 engaged with the pivot tube 110. The inner diameter of the damper bushing 172 includes a keyway 185b to straddle the arm stop 188 of the arm (see FIGS. 1 and 2). As shown in FIG. 12, the bottom surface of the damper bushing may include tabs 199a mateable in matching detents 199b, or vice versa to further register the damper bushing for rotation with the arm 106.

Also, optionally, as shown in FIGS. 2, 3, and 12, the high-offset belt tensioner may include an annular seal member 196 radially, outwardly juxtaposed to the outermost surface of the damper bushing 172 and seated beneath the arm plate 174 to add another barrier against debris and/or contaminants. The annular seal member 196 can be an X-ring, V-ring seal, or O-ring seal.

Figure 14:
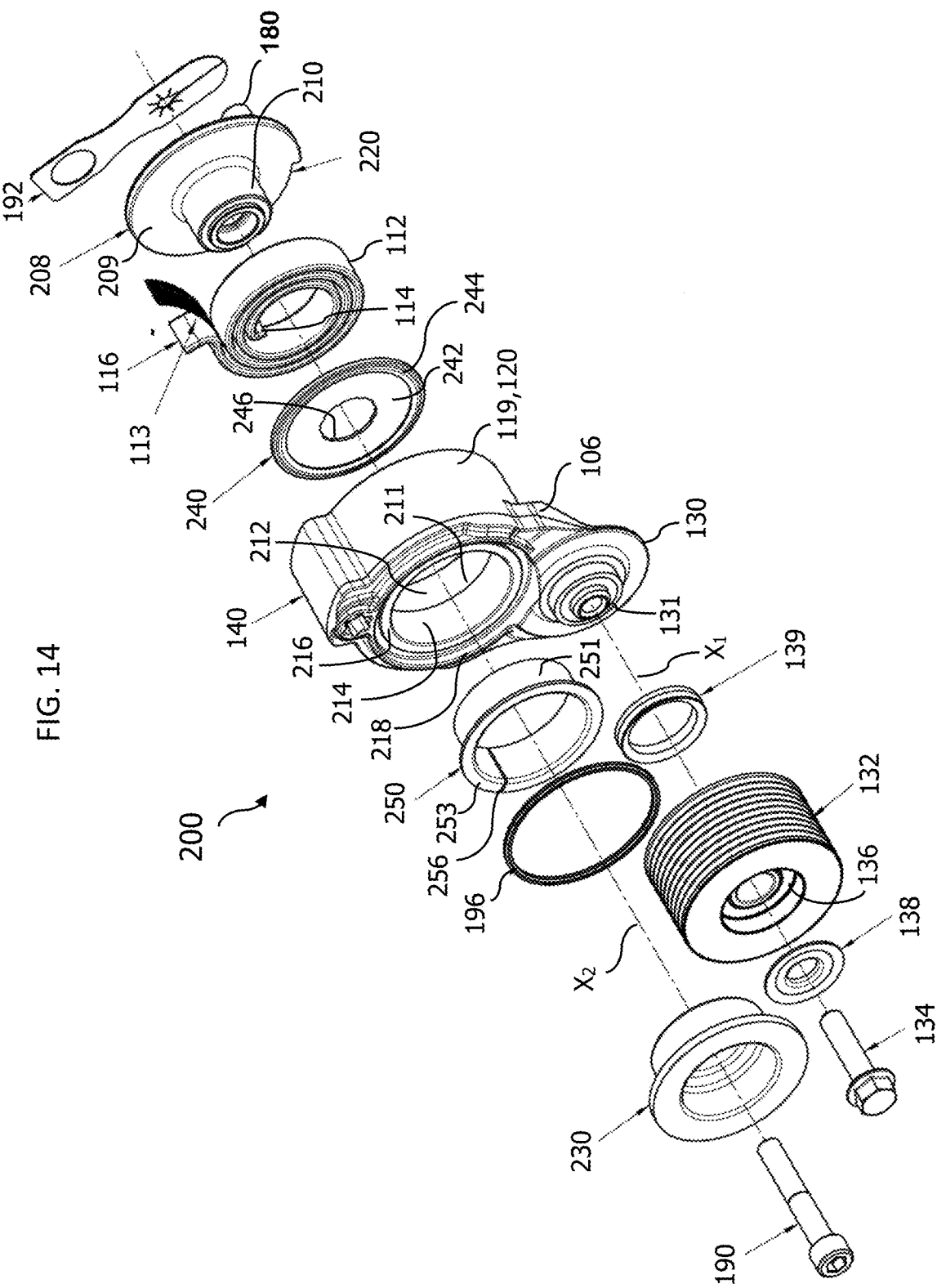
FIG. 14 is an exploded, top perspective view of a high-offset belt tensioner of a second embodiment.
Figure 15:
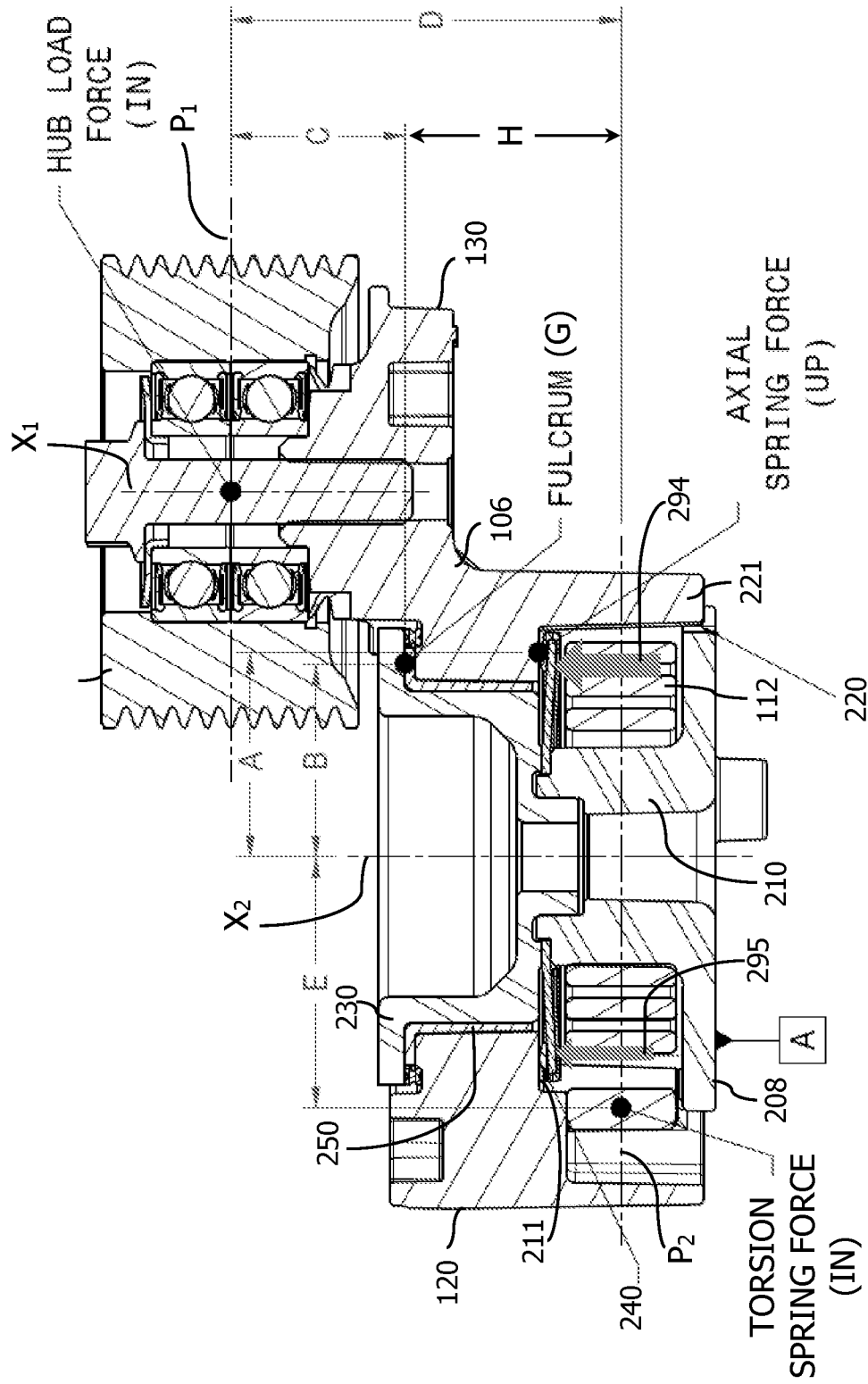
FIG. 15 is a longitudinal, cross-sectional view of the high-offset belt tensioner of FIG. 14.

Turning now to the embodiment of FIGS. 14 and 15, a second embodiment of a high-offset belt tensioner 200 for providing a predetermined amount of tension upon a belt (B) of a belt system, often found in engine systems, such as a transmission belt system is exemplified. The components in this embodiment that are the same as those of the first embodiment have been marked with the same reference numbers. The details of those components can be found above with respect to the first embodiment. Those features that have been changed or are new have been numbered in the 200s. The tensioner 200 includes an arm 106 pivotally mounted to a support base 208, which has a pivot tube 210 defining a pivot axis ($X_2$) about which the arm pivots, and a torsion spring, here a flat wire spring 112 with a spring tape 113, operatively coupled between the arm 106 and the support base 208. The belt tensioner 200 includes a bolt 190 received in and through the pivot tube 210 for mounting the belt tensioner in an engine system. A bolt retainer 192 is present to hold the bolt 190 in place (and the components together) until time to install the belt tensioner 200 in the engine system. The arm 106 has a pivot tube-receiving first end 120 having a lower surface defined by an interior shoulder 211 that faces the support base 208, a circumferential outer wall 119 defining a spring case 212, and a cup 214 facing the opposite direction relative to the spring case 212. The cup 212 has an outer annular lip 216 that is recessed into the upper surface 218 of the arm 106. The arm 106 has a second end 130 offset axially from the first end that defines a pulley rotation axis ($X_1$). A pulley 132 is mounted for rotation to the second end 130 of the arm 106 in the same manner described above with respect to the first embodiment.

The flat wire torsion spring 112 has an inner spring end 114 attached to the pivot tube 210 and an outer spring end 116 attached to the arm 106 at a position that counterbalances the hub load force. This construction has all the same benefits discussed above with respect to counter-balancing the hub load. As labeled in FIG. 15, a fulcrum (G) is defined between the first end 120 and the second end 130 of the arm and a first lineal axial distance (C) from the fulcrum (G) to the plane of hub load force ($P_1$) is smaller than a second lineal axial distance (H) from the fulcrum to the plane of the spring force ($P_2$), but is closer to being half the distance of D than in the first embodiment, which is an improvement. The torsion spring force (E) has been moved away from the pivot tube, and the fulcrum radius (B) is even closer to being the same length as (A) (with (B) being as large as possible) in this embodiment, which again is an improvement over the first embodiment while still achieving all the same advantages. Moreover, the number of components has been reduced.

Referring again to FIGS. 14 and 15, in this embodiment, the arm limiting travel slot 220 has been moved from the pivot tube 210 to the outer perimeter of the main body 209 of the support base 208. The arm travel limiting slot 220 defines a preselected number of degrees for a maximum rotation of the arm 106 and the arm has a mating feature 221 engaged with the arm travel limiting slot (best seen in FIG. 15). As used herein, with respect to the components illustrated in FIG. 15, outer and inner are relative to the axis of rotation $X_2$, where being proximate or more proximate the axis of rotation is "inner" and being distal or more distal the axis of rotation is "outer."

The pivot bushing 250 has been simplified in construction by eliminating the tab and key protrusions of the first embodiment, thereby having simply a main cylindrical body 251 and a radially inward or outward extending flange 253 at a first end of the body 251. In FIG. 14, the flange 253 is extending radially outward and will be seated against the lip 216 of the cup 214 and the main cylindrical body 251 will be seated against the interior surface of the cup 214 as seen in the assembled view of FIG. 15. The pivot bushing 250 is held in operative engagement with the arm 106 by an end cap 230 that is fixedly connected to the support base 208 by the bolt 190, such that the arm will rotate relative to the pivot bushing 250. The pivot bushing 250 can have a slit 256 extending axially through the flange 253 and the body 251, thereby allowing expansion thereof. A ring seal member 196 is optionally seated juxtaposed to a radial outermost surface of the flange 253 of the pivot bushing 250 to provide protection against debris and contaminants. The ring seal member 196 can be a V-ring seal, X-ring seal, O-ring, etc.

The damping mechanism 240 has been simplified into single component, a spring plate 242 with damper bushing material 244 co-molded thereto, as taught in U.S. Pat. No. 9,249,866. The first embodiment can also have a co-molded damping mechanism. The damping mechanism 240 is constructed by first over-molding the damper bushing material 244 over a substantially flat hardened metal washer, referred to as a non-deflected spring plate. This co-molded component must then be acted upon by a deforming work piece to deform the non-deflected spring plate into its preferred, conical shape, best seen in FIG. 15. The change in the orientation of the non-deflected spring plate from being perpendicular to the axis of rotation $X_2$ of the tensioner to being conically angled toward the axis of rotation $X_2$ at an angle less than 90° thereto provides an active engagement of the damping material with the shoulder 211 of the arm 106. The biasing properties of the spring plate 242 (due to the substantially conical shape of the spring plate after deformation) acts to force the annular protrusion against the shoulder 211, i.e., a rub surface, referred to herein as a deflection force. The damper bushing material 244 has an exterior surface that is facing the surface of the arm 106 defined in the interior shoulder 211 for a damping, frictional engagement therewith, which acts to dampen severe pivotal movements of the arm 106 due to the torsionals experienced by the drive belt (B).

This exterior surface of the damper bushing material 244 has an annular protrusion protruding therefrom toward the shoulder 211 of the arm 106. The shoulder 211 can include a trough in the surface of the arm in which the protrusion of the damper bushing material 244 is seated for the damping, frictional engagement. Typically, the annular protrusion is proximate the edge that defines the spring plate's outer diameter. The protrusion when viewed in a longitudinal cross-section of the damper assembly can have an arcuate profile as disclosed in the '866 patent. The arcuate profile of the protrusion may have a constant radius or a varying radius. In one embodiment, the arcuate profile is a semi-circular arc. In another embodiment, the arcuate profile is an elliptical arc. In another embodiment, the arcuate profile is a lobular shape. In the protrusion-trough design, the annular protrusion keeps the deflection force directed to a single location provided by the location of the trough. And, based on the annular protrusion's position, the deflection force of the damping mechanism 240, resulting from the conical shape of the spring plate 242, is generally at the edge defining the outer diameter of the damper assembly, and more particularly is at the edge defining the outer diameter of the spring plate 242, thereby providing a biasing force urging the damper bushing into engagement with the arm.

Referring again to FIGS. 11 and 15, the deflection height of the axially biasing members 160, 242 (242 also being referred to as a spring plate), respectively, can be varied across the spring plate during the deformation process such that the force acting on the arm is greater (greatest deflection height) at a first position represented by arrow 194, 294 which is opposite the hub load, to further balance the forces compared to the force acting at a second position opposite the first position, which is not opposite the hub load. The second position is represented by arrow 195, 295 in FIGS. 11 and 15, respectively.

As best seen in FIG. 14, the non-deflected spring plate 242 can include a plurality of teeth 246 extending radially inwardly from the inner circumferential surface thereof that defines the inner diameter. These teeth 246 become embedded into the outer circumferential surface of the pivot tube 210 at the upper end of the pivot tube to securely attach the damping mechanism 240 to the pivot tube 210. In all aspects, the periphery of the spring plate 242 defining the inner diameter is sandwiched between the pivot tube 210 and the cap 230, thereby rendering the damping mechanism 240 stationary, i.e., non-rotatable. As such, the arm 106 rotates relative to the damping mechanism 240.

The arm, pivot base, and/or cap are often made of metallic material such as solid steel, aluminum, or powdered metal. The spring plate 242 is, in an exemplary embodiment, a hardened steel plate and the damper bushing material 244 is typically a wear resistant plastic. The wear resistant plastic can be, but is not limited to, all polyamides (PA) including 66 nylon, 6 nylon, 11 nylon, 12 nylon, 69 nylon, 612 nylon, and 610 nylon, polyamide 46 nylon; polyethermides (PEI); polysulfones (PSU); polyethersulfones (PES); polyoxymethylenes (POM), or acetals; polyetheretherketones (PEEK); polyphenylene sulfides (PPS); polypthalamides (PPS), or amodels; polyphenylene sulfides (PPO); and amorphous nylons.

The belt tensioners discussed herein have numerous advantages, many of which have been already discussed above. Some additional advantages are provided in this paragraph. A flat wire spring is advantageous because it has a lower torque per degree of rotation and less degrees of variation than a round wire spring. A flat wire spring also has less resonance issues than a round wire spring and the use of spring tape between the spring's coils can further reduce noise. Additionally, the flat wire spring reduces the tensioner's axial height (H), which can be advantageous in installing the tensioner in various motor configurations.

During normal tensioning, when a belt presses against a pulley attached to the arm 106, the arm will rotate about the pivot axis $X_2$ thereby winding the torsion spring 112. The torsional spring upon winding will apply spring torque against the arm 106 to move, hold, or press the arm and pulley against the belt. When the arm 106 rotates about the pivot axis $X_2$, winding the torsion spring 112, the frictional contact between a tensioner component and the damping mechanism 150 and 170 or 230, 240 and 250 reduces or acts to minimize the rotation of the arm in the un-tensioning direction. The damping mechanism's operative engagement with the arm herein provides frictional symmetric damping.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A high-offset belt tensioner comprising:
   a support base having a pivot tube that defines a pivot axis;
   an arm coupled to the support base for rotation about the pivot axis, the arm having a pivot tube-receiving first end having a lower surface facing the support base and an upper surface that in part defines a cup and having a second end offset axially from the first end, wherein the second end defines a pulley rotation axis;
   a flat wire torsion spring having an inner spring hook attached to the pivot tube and an outer spring hook attached to the first end of the arm at a position that counterbalances a hub load force, wherein the flat wire torsion spring biases the arm in a belt engaging direction and applies a spring force acting on the arm; and
   a damper bushing in operative engagement with the first end of the arm by a spring plate or an axially biasing member;
   wherein a direction of the spring force acting on the arm stays in the same location with respect to the arm and moves with the arm throughout its entire sweep in the belt engaging direction;
   wherein the spring plate and the axially biasing member each have a deflection height that is varied across a surface area thereof, and a greatest deflection height is positioned to be opposite the hub load;
   wherein a plane of the hub load force is axially offset from a plane of the spring force.

2. The high-offset belt tensioner of claim 1, comprises a pivot bushing seated within the first end of the arm.

3. The high-offset belt tensioner of claim 2, wherein the spring plate is present and has the damper bushing co-molded thereto.

4. The high-off-set belt tensioner of claim 3, wherein the spring plate and the damper bushing are stationary as the arm rotates relative thereto.

5. The high-off-set belt tensioner of claim 4, wherein the spring plate has a bore therethrough defining an inner periphery and the inner periphery is seated between the pivot tube and an end cap with the damper bushing in contact with the lower surface of the first end of the arm; wherein the arm plate is conically shaped, thereby biasing the damper bushing into frictional engagement with the arm.

6. The high-offset belt tensioner of claim 2, wherein the damper bushing is seated in the cup of the first end of the arm, wherein the spring plate is present and is fixedly attached to the pivot tube and holds the damper bushing in operative engagement for rotation with the arm.

7. The high-offset belt tensioner of claim 6, wherein the damper bushing has a flange extending axially toward the support base, and the flange is seated against the pivot tube.

8. The high-offset belt tensioner of claim 7, wherein a wear surface of a main body of the damper bushing is seated against the spring plate and the main body includes a plurality of troughs for retention of grease.

9. The high-offset belt tensioner of claim 8, comprising a ring seal member seated juxtaposed to an outermost surface of the flange of the damper bushing.

10. The high-offset belt tensioner of claim 2, wherein the arm has a radially protruding enclosure in its radially outermost surface at a position that locates the enclosure in a protective orientation around the outer spring hook; wherein the enclosure has an open bottom.

11. The high-offset belt tensioner of claim 10, wherein the pivot bushing has an axially extending main body and either a radially inward or radially outward extending flange at a first end of the main body.

12. The high-offset belt tensioner of claim 11, wherein the pivot bushing has a slit extending axially through the main body, thereby allowing expansion of at least a second end thereof.

13. The high-offset belt tensioner of claim 12, wherein the pivot bushing is seated with the flange between the support base and the lower surface of the first end of the arm.

14. The high-offset belt tensioner of claim 13, wherein the pivot bushing has a key protruding from an outer surface of the main body and the key is seated in a keyway of the arm for rotation therewith.

15. The high-offset belt tensioner of claim 14, wherein the pivot bushing has a radially outward extending tab opposite the key; wherein the enclosure has received therein the radially outward extending tab.

16. The high-offset belt tensioner of claim 14, wherein the slit is positioned through the key of the pivot bushing.

17. The high-offset belt tensioner of claim 11, wherein the pivot bushing is seated with the flange between the cup of the arm and an end cap.

18. The high-offset belt tensioner of claim 1, wherein the support base has an arm travel limiting feature defining a preselected number of degrees for a maximum rotation of the arm and the arm has a mating feature engage with the arm travel limiting feature; wherein the arm travel limiting feature is an arcuate slot in the pivot tube or a base of the support base.

19. A high-offset belt tensioner comprising:
a support base having a pivot tube that defines a pivot axis;
an arm coupled to the support base for rotation about the pivot axis, the arm having a pivot tube-receiving first end defining a cup and having a second end offset axially from the first end, wherein the second end defines a pulley rotation axis;
an end cap seated within the cup of the arm;
a flat wire torsion spring having an inner spring hook operatively attached to the pivot tube and an outer spring hook operatively attached to the first end of the arm at a position that counterbalances a hub load force; and
a damper bushing in operative engagement with the first end of the arm;
a spring plate or an axially biasing member urging the damper bushing into engagement with the first end of the arm; and
a pivot bushing having a radially outward extending flange seated with the radially outward extending flange between the arm and the end cap; and
a ring seal member seated juxtaposed to an outermost surface of the radially outward extending flange of the pivot bushing.

\* \* \* \* \*